United States Patent
Spagnola

(10) Patent No.: US 9,412,281 B2
(45) Date of Patent: Aug. 9, 2016

(54) LEARNING SYSTEM SELF-OPTIMIZATION

(71) Applicant: Pearson Education, Inc., Upper Saddle River, NJ (US)

(72) Inventor: Perry M. Spagnola, Phoenix, AZ (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

(21) Appl. No.: 14/089,432

(22) Filed: Nov. 25, 2013

(65) Prior Publication Data

US 2015/0147741 A1    May 28, 2015

(51) Int. Cl.
G09B 7/00    (2006.01)
G09B 7/04    (2006.01)
G09B 7/02    (2006.01)

(52) U.S. Cl.
CPC ... *G09B 7/04* (2013.01); *G09B 7/02* (2013.01)

(58) Field of Classification Search
CPC .............. G09B 5/00; G09B 5/02; G09B 5/04; G09B 5/06
USPC .......... 434/322, 323, 350, 362, 365; 707/790, 707/802
See application file for complete search history.

(56) References Cited

U.S. PATENT DOCUMENTS

| | | | |
|---|---|---|---|
| 4,175,339 A | 11/1979 | Jones | |
| 6,484,010 B1 * | 11/2002 | Sheehan | 434/362 |
| 6,808,392 B1 * | 10/2004 | Walton | 434/236 |
| 8,016,680 B1 | 9/2011 | Hutter et al. | |
| 8,033,831 B2 * | 10/2011 | Julia et al. | 434/185 |
| 8,052,426 B2 * | 11/2011 | Snyder et al. | 434/365 |
| 8,641,424 B2 | 2/2014 | Soldavini | |
| 8,753,200 B1 | 6/2014 | Supanc et al. | |
| 2002/0160347 A1 | 10/2002 | Wallace et al. | |
| 2002/0165912 A1 | 11/2002 | Wenocur et al. | |
| 2004/0009461 A1 | 1/2004 | Snyder et al. | |
| 2004/0083229 A1 | 4/2004 | Porter | |
| 2005/0060221 A1 | 3/2005 | Kolar et al. | |
| 2006/0257841 A1 | 11/2006 | Mangano | |
| 2007/0292826 A1 | 12/2007 | Goddy et al. | |
| 2008/0040370 A1 | 2/2008 | Bosworth et al. | |
| 2009/0075709 A1 | 3/2009 | Park | |
| 2009/0170058 A1 | 7/2009 | Walker | |
| 2009/0197237 A1 * | 8/2009 | Couch et al. | 434/362 |
| 2010/0143873 A1 * | 6/2010 | Keim et al. | 434/156 |

(Continued)

OTHER PUBLICATIONS

Quantiles.com; The Quantile Framework for Mathematics; Feb. 18, 2006. [online], [retrieved on Feb. 9, 2014]. Retrieved from the Wayback Machine, archive.org <https://web.archive.org/web/20060218165157/http://www.quantiles.com/EntrancePageFlash.html?1>.*

(Continued)

*Primary Examiner* — Peter Egloff
(74) *Attorney, Agent, or Firm* — Kilpatrick Townsend & Stockton LLP

(57) ABSTRACT

A method/system for learning system self-optimization is disclosed. The learning system can include a plurality of learning objects that are connected to each other by a plurality of learning vectors. The learning vectors can identify a pre-requisite relationship between the connected learning objects and include data indicating a likelihood of success of a student in traversing the learning vector and/or an expected speed for traversing the learning vector. Data generated from a student's traversal of one of the learning vectors can be used to strengthen or weaken the traversed learning vector based on the student experience.

29 Claims, 9 Drawing Sheets

(56) References Cited

U.S. PATENT DOCUMENTS

| | | |
|---|---|---|
| 2011/0039242 A1* | 2/2011 | Packard et al. ............... 434/308 |
| 2011/0177480 A1* | 7/2011 | Menon et al. ................. 434/238 |
| 2011/0189643 A1 | 8/2011 | Hutchinson |
| 2011/0195389 A1 | 8/2011 | DeYoung et al. |
| 2012/0040326 A1 | 2/2012 | Larson-Rutter et al. |
| 2012/0231438 A1 | 9/2012 | Fakhrai |
| 2014/0024009 A1 | 1/2014 | Nealon et al. |
| 2014/0310729 A1 | 10/2014 | Chaniotakis |
| 2015/0119120 A1 | 4/2015 | Spagnola |
| 2015/0147741 A1 | 5/2015 | Spagnola |
| 2015/0150144 A1 | 5/2015 | Hughes et al. |
| 2015/0179078 A1 | 6/2015 | Spagnola |

OTHER PUBLICATIONS

First Action Interview Pilot Program Pre-Interview Communication mailed on Sep. 23, 2014 for U.S. Appl. No. 14/154,050, 4 pages.
First Action Interview Pilot Program Pre-Interview Communication mailed on Mar. 4, 2014 for U.S. Appl. No. 14/137,890, 4 pages.
Non-Final Office Action mailed on Aug. 8, 2014 for U.S. Appl. No. 14/137,890, 5 pages.
Non-Final Office Action mailed May 19, 2015 for U.S. Appl. No. 14/524,948, filed Oct. 27, 2014, all pages.
Office Action dated Sep. 3, 2015, in U.S. Appl. No. 14/788,228, 23 pages.
Office Action dated Oct. 29, 2015, in U.S. Appl. No. 14/788,228, 13 pages.
Quantiles.com; The Quantile Framework for Mathematics; Feb. 18, 2006. [online], retrieved on Feb. 9, 2014]. Retrieved from the Wayback Machine, archive.org https://web.archive.org/web/20060218165157/http://www.quantiles.com/EntrancePageFlash.html?1.
Final Office Action dated Dec. 10, 2015, for U.S. Appl. No. 14/524,948, 7 pages.
First Action Interview Pilot Program Pre-Interview Communication dated Dec. 15, 2015, for U.S. Appl. No. 14/754,337, 7 pages.

* cited by examiner

(12) United States Patent
US 9,412,281 B2

LEARNING SYSTEM SELF-OPTIMIZATION

BACKGROUND OF THE INVENTION

This disclosure relates in general to on-line or computerized learning including, but without limitation to learning or instruction with a Learning Management System (LMS) and/or Online Homework System (OHS) and, but not by way of limitation, to assisting students using the LMS and/or OHS.

Numerous resources can be used in facilitating student achievement of an education goal. These resources can include, but not by way of limitation, instructional resources such as lectures, demonstrations, or example problems, practice resources such as practice problems or assignments, evaluation resources including, for example, a quiz, a test, or the like, and remediation resources. These resources are frequently provided according to a curriculum or syllabus. In particular, in the class-room environment, a syllabus identifies the resources that will be provided to a student and outlines the order in which resources will be provided to a student.

BRIEF SUMMARY OF THE INVENTION

In one embodiment, the present disclosure provides systems and methods for the self-optimization of the learning system. In some embodiments, the learning system includes a plurality of learning objects that are interconnected by a plurality of learning vectors. In some embodiments, each of the learning vectors can connect an incident learning object to a terminal learning object and identify the prerequisite relationship between the incident learning object and the terminal learning object. In some embodiments, the learning vector can further include information identifying the likelihood of a student successfully traversing the learning vector and/or successfully completing the terminal learning object of the learning vector, and in some embodiments, the learning vector can include information identifying the expected amount of time for student to successfully traverse the learning vector and/or to successfully complete the terminal learning object.

In some embodiments, information associated with the learning vector can be updated based on collected data relating to student experiences with the learning vector and/or with the associated terminal learning object. In some embodiments, for example, responses and/or inputs provided during the completion of the learning object can be evaluated and can be used to determine whether the student successfully traversed the learning vector and/or successfully completed the learning object. If the student successfully completed the learning object and/or successfully traversed learning vector, a value indicating the likelihood of successful traversal of the learned vector can be increased. Likewise, if the student failed to successfully complete the learning object and/or to successfully traverse the learning vector, then a value indicating the likelihood of successful traversal of the learned vector can be decreased.

In one embodiment, the present disclosure relates to a method of maintaining and/or updating a learning vector. The method can include identifying a first learning object that can include a first aggregation of learning content that can be associated with an assessment, identifying a second learning object that can include a second aggregation of learning content that can be associated with an assessment, identifying a prerequisite relationship between the first learning object and the second learning object, in which prerequisite relationship the first learning object is a prerequisite to the second learning object, and generating a learning vector connecting the first learning object and the second learning object. In some embodiments, the learning vector can include a direction and a strength. In some embodiments, the direction of the learning vector can indicate that the first learning object is a prerequisite of the second learning object, and the strength of the learning vector can indicate a likelihood of the student successfully traversing the learning vector. In some embodiments, the method further includes receiving an input indicative of the traversal of the learning vector, which input identifies a student property and the effectiveness of the learning vector such as, for example, data relating to student mastery of the content of the learning objective, determining a value according to a Boolean function, which value can be a first value if the input indicative of the traversal of the learning vector indicates a desired outcome such as the successful traversal of the learning vector, and which value can be a second value if the input indicative of the traversal of the learning vector indicates an undesired outcome such as the unsuccessful traversal of the learning vector, and adjusting the learning vector according to the value. In some embodiments, the adjustment of the learning vector can include strengthening the learning vector if the value is the first value and in some embodiments the adjustment of the learning vector can include weakening the learning vector if the value is the second value.

In some embodiments, the method can further include retrieving a success threshold. In some embodiments, the success threshold can be a value, the attainment of which threshold indicates success or failure in the traversal of the learning vector. In some embodiments, the success threshold can be a plurality of thresholds. In some embodiments, some of the thresholds of the success threshold delineate between successful traversal of the learning vector and unsuccessful traversal of the learning vector with respect to different success metrics that can relate to, or be, for example, different portions of the subject matter of the learning vector.

In some embodiments, the learning object can include a plurality of content objects, each of which content objects can contain a portion of the learning content of the learning object. In some embodiments, for example, each of the content objects of the learning object can be associated with at least one of the some of the plurality of success metrics. In some embodiments at least one of the some of the plurality of success metrics can be indicative of mastery of the lexile content of the learning object and and/or of the quantile content of the learning object.

In some embodiments, the method can further include generating the assessment associated with the second learning object, which assessment can include a plurality of questions directed to the content of the success metrics. In some embodiments, determining a value according to a Boolean function can further include comparing the input indicative of the traversal of the learning vector to the success threshold. In some embodiments, this determined value is assigned if the comparison of the input indicative of the traversal of the learning vector to the success threshold indicates a successful traversal of the learning vector.

In one embodiment, the present disclosure relates to a method for optimizing a learning vector within a learning object network. The method can include identifying an incident learning object, which incident learning object can include an initial position of a student within the learning object network, identifying a plurality of potential terminal learning objects, which potential terminal learning objects can each include an aggregation of learning content associated with an assessment. In some embodiments, the incident learning object can be a prerequisite to each of the potential terminal learning objects. In some embodiments, the method can further include identifying a plurality of learning vectors, each of the plurality of learning vectors extending from the incident learning object to one of the potential terminal learning objects. In some embodiments, each of the plurality of learning vectors can indicate the prerequisite relationship with the incident learning object and can identify the strength of the learning vector. In some embodiments, the method includes selecting one of the plurality of potential terminal learning objects as the terminal learning object, providing the terminal learning object to the student, adding an identifier to memory associating the terminal learning object with the student, receiving an indicator of the completion of the learning object, which indicator can identify a student property and the effectiveness of the learning vector, determining a value according to a Boolean function, which value can be a first value if the indicator of the completion of the learning object indicates a desired outcome and which value can be a second value if the indicator of the completion of the learning object indicates an undesired outcome, and adjusting the strength of the learning vector according to the value. In some embodiments, the learning vector is strengthened if the value is the first value and in some embodiments the learning vector is weakened if the value is the second value.

In some embodiments, the method can further include retrieving a success threshold. In some embodiments, the success threshold can be a value, the attainment of which threshold indicates success or failure in the traversal of the learning vector. In some embodiments, the success threshold can be a plurality of thresholds. In some embodiments, some of the thresholds of the success threshold delineate between successful traversal of the learning vector and unsuccessful traversal of the learning vector with respect to different success metrics that can relate to, or be, for example, different portions of the subject matter of the learning vector.

In some embodiments, the learning object can include a plurality of content objects, each of which content objects can contain a portion of the learning content of the learning object. In some embodiments, for example, each of the content objects of the learning object can be associated with at least one of the some of the plurality of success metrics. In some embodiments at least one of the some of the plurality of success metrics can be indicative of mastery of the lexile content of the learning object and and/or of the quantile content of the learning object.

In some embodiments, the method can further include generating the assessment associated with the second learning object, which assessment can include a plurality of questions directed to the content of the success metrics. In some embodiments, determining a value according to a Boolean function can further include comparing the input indicative of the traversal of the learning vector to the success threshold. In some embodiments, this determined value is assigned if the comparison of the input indicative of the traversal of the learning vector to the success threshold indicates a successful traversal of the learning vector.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
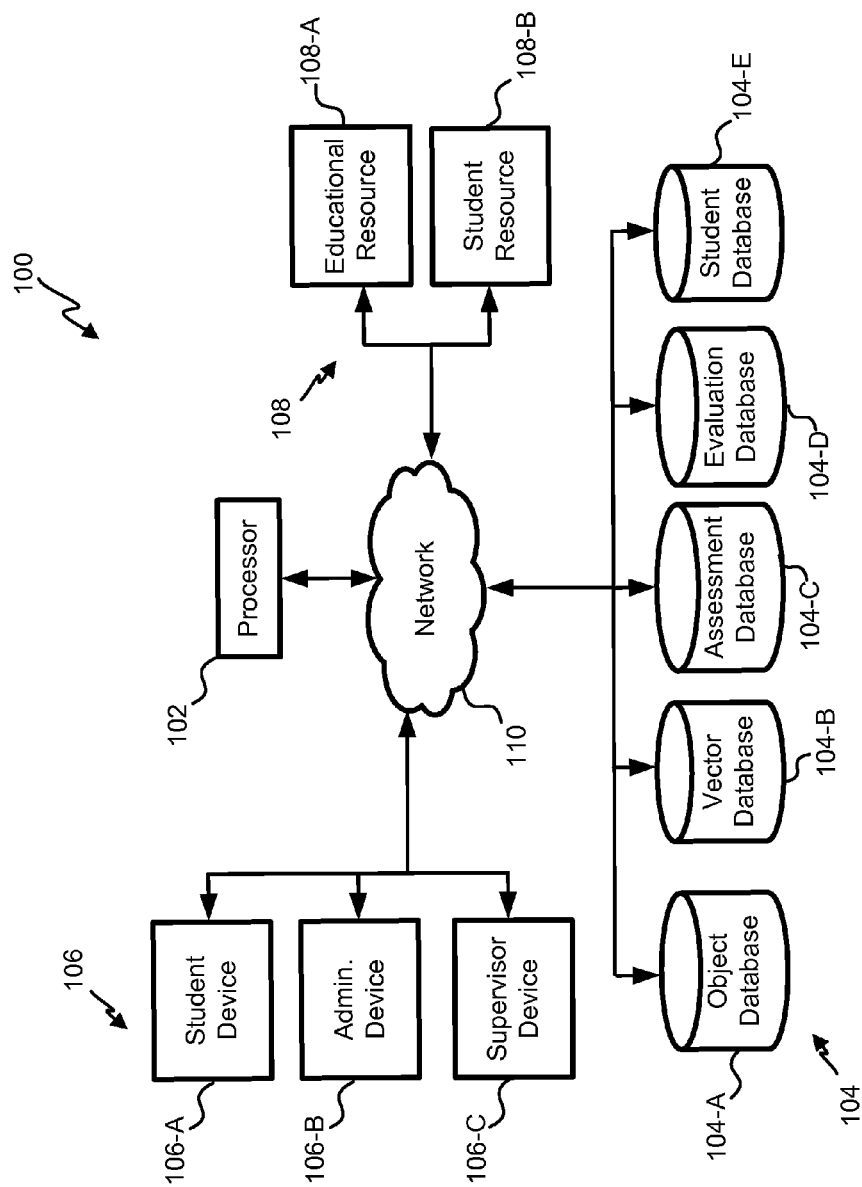
FIG. 1 is a schematic illustration of one embodiment of a learning system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment the present disclosure relates to systems and methods for optimizing learning vectors. In some embodiments, the optimization of the learning vectors can include the compilation of the student generated data, and the analysis of that data to determine the effectiveness of the learning object associated with the learning vector. This effectiveness can be characterized by a binary value indicating whether the student successfully traversed the learning vector and successfully completed material associated with the learning object. If the student successfully traversed the learning vector and completed material associated with the learning object, then a binary value indicative of the successful completion of the learning object would be associated with the student outcome and would be applied to the learning vector. This binary value would increase the strength of the learning vector to thereby indicate the success of the student in traversing the learning vector. If the student did not successfully traverse the learning vector and complete material associated with the learning object, then a binary value indicative of the failure of the student to successfully complete the learning object would be associated with the student outcome and would be applied to the learning vector. This binary value would decrease the strength of the learning vector to thereby indicate the failure of the student in traversing the learning vector.

In one embodiment, the present disclosure relates to systems and methods for optimizing learning vectors with respect to one or several student contexts including, for example, a student learning style. In some embodiments, the optimization of the learning vectors with respect to one or several student contexts can include the compilation of student generated data, and the analysis of that data to determine the effectiveness of the learning object associated with the learning vector for one or several student contexts. This effectiveness can be characterized by a binary value indicating whether the student successfully traversed the learning vector and completed material associated with the learning object. If the student successfully traversed the learning vector, the student contexts can be compared to a context of the learning vector. The student context can include information relating to a student's learning type and/or learning style as well as other information relating to past performance by the student. The context of the learning vector can include information relating to rates of success of students having different student contexts including, for example, different learning styles. If the student context matches the learning vector context, then the vector can be strengthened, and if the student context does not match the learning vector context, then the student information can be updated based on the effectiveness of the learning vector. Similarly, if the student fails to successfully traverse the learning vector, the student context can be compared to the context of the learning vector. If the student context matches the learning vector context, then the vector can be weakened, and if the student context does not match the learning vector context, then the student information can be updated based on the ineffectiveness of the learning vector.

With reference now to FIG. 1, a block diagram of one embodiment of a learning system 100 is shown. The learning system 100 collects, receives, and stores data relating to the actions of one or several students within a learning object network. In some embodiments, the learning object network can comprise a plurality of learning objects that are linked in prerequisite relationships via a plurality of learning vectors. The learning system 100 utilizes this data to create, maintain, and update learning vectors connecting learning objects within the learning object network. In some embodiments, the learning vectors can be updated based on the success and/or failure of a student in traversing the learning vector, the context of the learning vector, and/or the student context. In some embodiments, the learning vector context can be the aggregated information relating to the learning vector. This can include identification of the prerequisite relationship between the learning objects directly connected by the learning vector, the magnitude of the learning vector, the strength of the learning vector, and/or any other desired parameter of the learning vector. In some embodiments, the strength of the learning vector context can vary based on the student context. Thus, in some embodiments, the strength and/or magnitude of the learning vector can vary with respect to different student contexts. Thus, some student contexts may correspond to an increased strength and/or magnitude of the learning vector whereas other student contexts may correspond to a decreased strength and/or magnitude of the learning vector.

The learning system 100 can include a processor 102. The processor 102 can provide instructions to, and receive information from the other components of the learning system 100. The processor 102 can act according to stored instructions, which stored instructions can be located in memory associated with the processor and/or in other components of the learning system 100. The processor 102 can comprise a microprocessor, such as a microprocessor from Intel® or Advanced Micro Devices, Inc.®, or the like.

The learning system 100 can include one or several databases 104. The one or several databases 104 can comprise stored data relevant to the functions of the learning system 100. The one or several databases 104 can include an object database 104-A. The object database 104-A can include data relating to one or several learning objects. In some embodiments, a learning object can be an aggregation of learning content that can be, for example, associated with an assessment such as, for example, a test, quiz, one or several practice problems or questions, homework, or the like. The object database 104-A can, in some embodiments, include the learning objects, including any subcomponents of the learning objects such as, for example, one or several content objects containing instructional material, and specifically comprising a presentation of learning material and/or one or several assessment objects which can comprise a content object that includes features configured to assess the learning and/or mastery of the subject matter of one or several content objects by the student. In some embodiments, the learning object can include an initial content object and/or assessment object, one or several intermediate content objects and/or assessment objects, and one or several terminal content objects and/or assessment objects. In one embodiment, the terminal assessment object can assess the student's mastery of the content contained in some or all of the content objects within the learning object.

In some embodiments, the object database 104-A can include information to allow customization of the student learning experience. In one embodiment, for example, the object database 104-A can include threshold data that can be used in connection with student results to determine if a student is meeting expectations, exceeding expectations, far exceeding expectations, failing to meet expectations, or providing completely unsatisfactory results. In some embodiments, the object database 104-A can include thresholds that can be used to trigger the providing of learning objects to the student, which learning objects are not included in the selected learning path. In one embodiment, the object database 104-A can include one or several enhancement thresholds, and in some embodiments, the object database 104-A can include one or several remediation thresholds. In some embodiments, these learning objects can be one or several enhancement objects for a student who is exceeding and/or far exceeding expectations, and in some embodiments the learning objects can be one or several remedial objects for a student who is not meeting expectations.

The one or several databases 104 can include a vector database 104-B. The vector database 104-B can include information relating to one or several learning vectors. In some embodiments, and as discussed above, the learning object network can contain a plurality of learning objects. These objects can be connected via a plurality of learning vectors. A learning vector can connect a first learning object to a second learning object and can indicate a prerequisite relationship between the first and second learning objects, which prerequisite relationship can indicate the temporal order in which the first and second learning objects should be completed and/or attempted. In some embodiments, the first learning object, which is a prerequisite to the second learning object within the set defined by the first and second learning objects connected within a prerequisite relationship by the learning vector, can be identified as the incident learning object (LO$_I$), and the second learning object can be identified as the terminal learning object (LO$_T$).

In some embodiments, the vector database 104-B can include information relating to a variety of parameters of the learning vector. In some embodiments, this can include, for example, the strength of the learning vector, which strength can indicate the effectiveness of the learning vector and/or the degree to which students successfully traverse the learning vector and complete the learning object, the magnitude of the learning vector, which magnitude can provide an indicator of the rate at which one or several students have traversed and/or are expected to traverse the learning vector, a learning vector context including, for example, information identifying the strength and/or magnitude of the learning vector for one or several student contexts, or the like.

The learning system 100 can include an assessment database 104-C. The assessment database 104-C can include information identifying the connection and/or connections between learning objects within the learning object network. In some embodiments, the assessment database 104-C can include information relating to multidimensional linking between one or several learning objects. In some embodiments, the multiple dimensions of the learning object network can be the subject matter of the learning object network, skills that are relevant to the completion and/or comprehension of the subject matter of the learning object network skills but that are not the object of the learning object network such as, for example, reading (lexile) skills and math (quantile) skills. In some embodiments, information contained within the assessment database 104-C can be used in placing the learning objects within the learning object network and/or in connecting new learning objects with other objects within the learning object network.

The learning system 100 can include an evaluation database 104-D. The evaluation database 104-D can include information used in evaluating the effectiveness of one or several learning objects, one or several learning sequences, one or several content objects, one or several assessment objects, and/or the like. In some embodiments, for example, this information can include one or several effectiveness thresholds which can define the boundary between satisfactory results associated with one or several of the above and unsatisfactory results associated with one or several of the above.

The learning system 100 can include a student database 104-E. The student database 104-E can include information relating to one or several students including, for example, student contexts for one or several students. In some embodiments, a student context can contain information relating to past learning completed by the associated student, objectives of the student, which objectives can be the learning goals of the student including, for example, the achievement of a desired or specified position within the learning object network, and/or the learning style of the student. In some embodiments, the information contained within student database 106-E can be updated based on the results of interactions between the student and the learning object network. In some embodiments, and based on continual updates to the student context, information contained within the student database 106-E can be biased for temporal significance in that a biasing function can be applied to information contained within the student database to place greater weight on recently collected data. In some embodiments, the temporal biasing function can advantageously allow recently collected data to more significantly affect the student context than older, and potentially stale data relating to the student.

The learning system 100 can include one or several user devices 106, which can include, a student device 106-A, an administrator device 106-B, and/or a supervisor device 106-C. The user devices 106 allow a user, including a student including a learner, an evaluator, a supervisor, a trainer, and/or a trainee to access the learning system 100. The details and function of the user devices 106 will be discussed at greater length in reference to FIG. 2 below.

The learning system 100 can include a data source 108. The data source 108 can be the source of the one or several learning objects, content objects, assessment objects, or the like, and can be the source of some or all of the student information stored within the student database 104-D. In some embodiments, the data source 108 can include, for example, an educational resource 108-A and a student resource 108-B. In some embodiments, the educational resource 108-A can include a Learning Management System (LMS), an educational institution, a training institution, or the like, and a student resource 108-B can include, for example, any source of information relating to the student and/or pass student performance.

The learning system 100 can include a network 110. The network 110 allows communication between the components of the learning system 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

Figure 2:
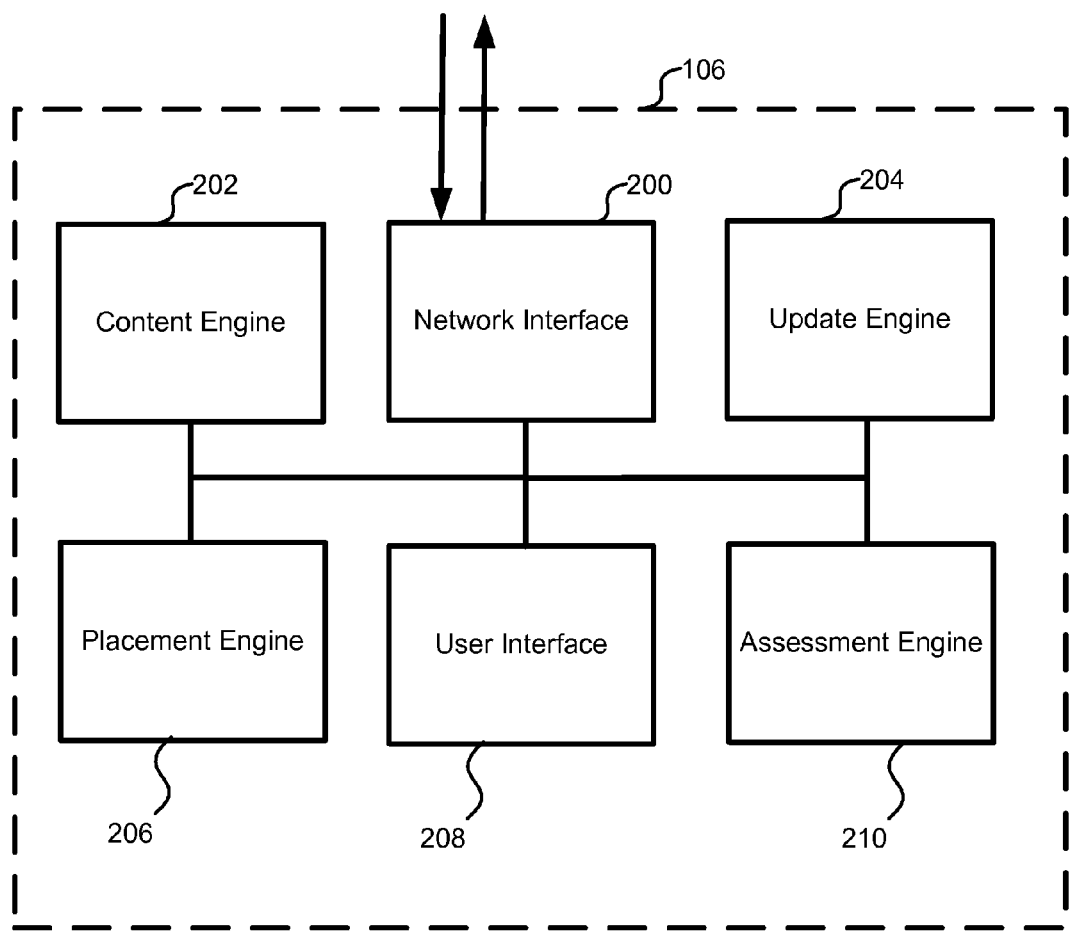
FIG. 2 is a schematic illustration of one embodiment of a user device for use with the learning system.

With reference now to FIG. 2, a block diagram of one embodiment of a user device 106 is shown. As discussed above, the user device 106 can be configured to provide information to and/or receive information from other components of the learning system 100. The user device can access the learning system 100 through any desired means or technology, including, for example, a webpage, a web portal, or via network 110. As depicted in FIG. 2, the user device 106 can include a network interface 200. The network interface 200 allows the user device 106 to access the other components of the learning system 100, and specifically allows the user device 106 to access the network 110 of the learning system 100. The network interface 200 can include features configured to send and receive information, including, for example, an antenna, a modem, a transmitter, receiver, or any other feature that can send and receive information. The network interface 200 can communicate via telephone, cable, fiber-optic, or any other wired communication network. In some embodiments, the network interface 200 can communicate via cellular networks, WLAN networks, or any other wireless network.

The user device 106 can include a content engine 202. The content engine 202 can receive one or several learning objects and/or content objects from the object database 104-A, and can communicate them to the user via the user interface of the user device 106.

The user device 106 can include an update engine 204. In some embodiments, the update engine 204 can be configured to receive information relating to the traversal of one or several learning vectors and update the learning vectors based on the student experience associated with the terminal learning object of the one or several learning vectors. In some embodiments, the update engine 204 can be configured to update the learning vector according to the student context and/or the context of the learning vector. In some embodiments, this can include updating the learning vector according to one or several learning styles. In some embodiments, the update engine 204 can receive information from, and/or provide information to the vector database 104-B.

The user device 106 can include a placement engine 206. The placement engine 206 can be configured to place one or several learning objects within the learning object network. Specifically, in some embodiments, the placement engine can be configured to identify prerequisite relationships for a new learning object. In some embodiments, these prerequisite relationships can be within the subject matter of the learning object in some embodiments, these prerequisite relationships can be outside of the subject matter of the learning object. In some embodiments, the placement engine 206 can receive information from, and/or send information to the assessment database 104-C.

The user device 106 can include a user interface 208 that communicates information to, and receives inputs from a user. The user interface 208 can include a screen, a speaker, a monitor, a keyboard, a microphone, a mouse, a touchpad, a keypad, or any other feature or features that can receive inputs from a user and provide information to a user.

The user device 106 can include an assessment engine 210. The assessment engine can be configured to assess the effectiveness of one or several items within the learning object network including, for example, one or several learning objects, one or several learning sequences, and/or one or several content objects. In some embodiments, the assessment engine 210 can assess the contents of the learning object network in connection with information stored within the evaluation database 104-D. In some embodiments, the assessment engine 210 can send information to, and/or receive information from the evaluation database 104-D.

Figure 3:
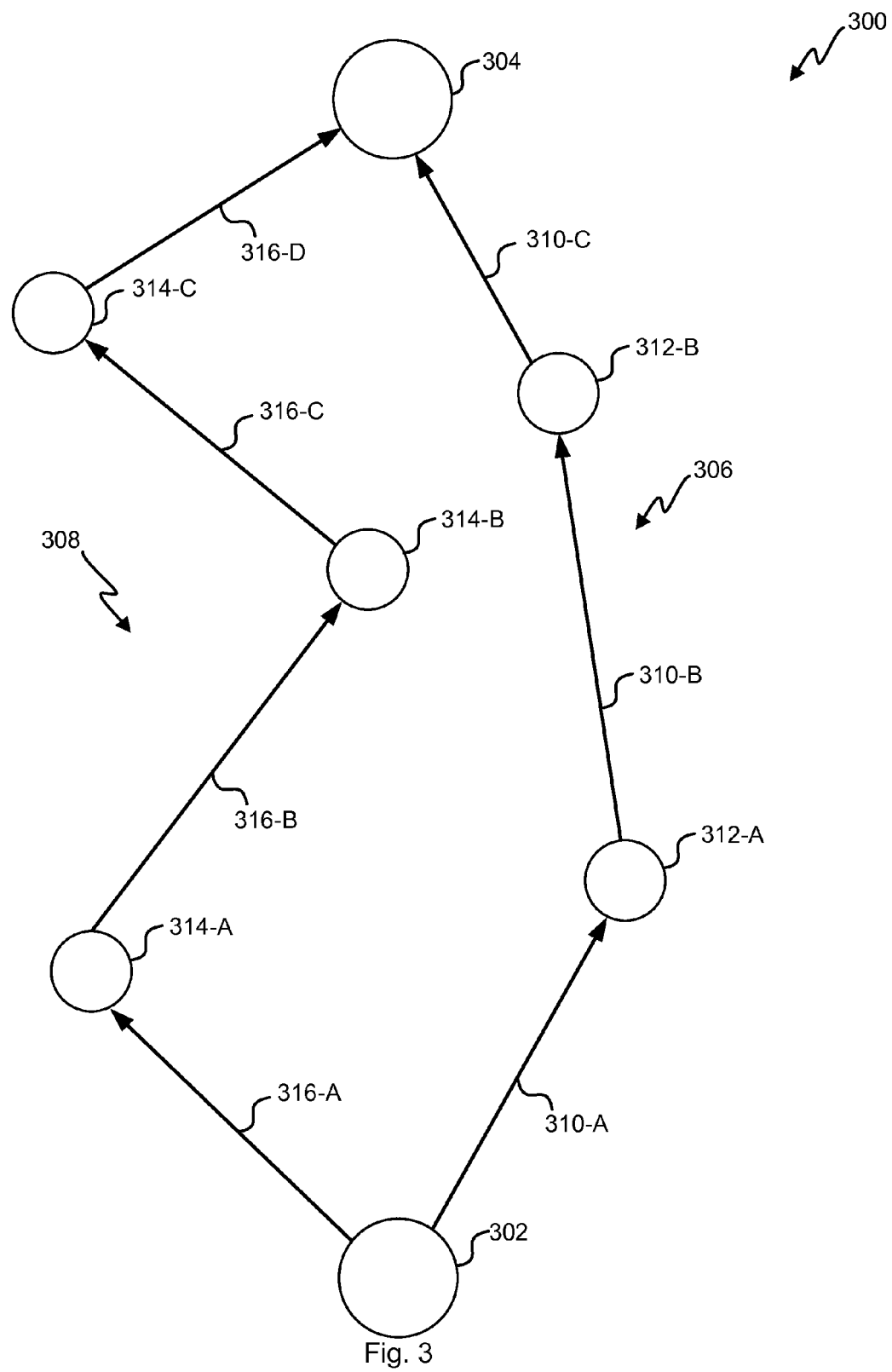
FIG. 3 is a schematic illustration of one embodiment of a learning object network containing two indicated learning sequences.

With reference now to FIG. 3, a schematic illustration of one embodiment of the learning object network 300 is shown. In some embodiments, the learning object network 300 can comprise a plurality of learning objects connected via a plurality of learning vectors. In the embodiment depicted in FIG. 3, the learning object network 300 includes a starting learning object 302 and a destination learning object 304. As seen in FIG. 3, the starting learning object 302 and the destination learning object 304 are connected by a first learning sequence 306 and the second learning sequence 308. The first learning sequence 306 comprises learning objects 312-A and 312-B which are connected with each other and with both of the starting learning object 302 and the destination learning object 304 via learning vectors 310-A, 310-B, and 310-C. Similarly, the second learning sequence 308 comprises learning objects 314-A, 314-B, and 314 C, which are connected with each other and with both of the starting learning object 302 and the destination learning object 304 via learning vectors 316-A, 316-B, 316-C, and 316-D. As seen in FIG. 3, the magnitude of the learning vectors 310-A, 310-B, 310-C, 316-A, 316-B, 316-C, 316-D is not constant and some of the learning vectors 310-A, 310-B, 310-C, 316-A, 316-B, 316-C, 316-D have a greater magnitude than others of the learning vectors 310-A, 310-B, 310-C, 316-A, 316-B, 316-C, 316-D, and some of the learning vectors 310-A, 310-B, 310-C, 316-A, 316-B, 316-C, 316-D have a lesser magnitude than others of the learning vectors 310-A, 310-B, 310-C, 316-A, 316-B, 316-C, 316-D. Similarly, the aggregate magnitude of the first learning sequence 306, which aggregate magnitude is the sum of the magnitudes of the learning vectors 310-A, 310-B, 310-C in the first learning sequence 306, is less than the aggregate magnitude of the second learning sequence 308, which aggregate magnitude is the sum of the magnitudes of the learning vectors 316-A, 316-B, 316-C, 316-D in the second learning sequence 308. In some embodiments, the magnitude of the learning vectors 310-A, 310-B, 310-C, 316-A, 316-B, 316-C, 316-D and/or the magnitude of the learning sequence 306, 308 can correspond to the length of time required to complete a learning vector 310-A, 310-B, 310-C, 316-A, 316-B, 316-C, 316-D and/or a learning sequence 306, 308, by the effectiveness and teaching mastery of the subject matter of the same.

Figure 4:
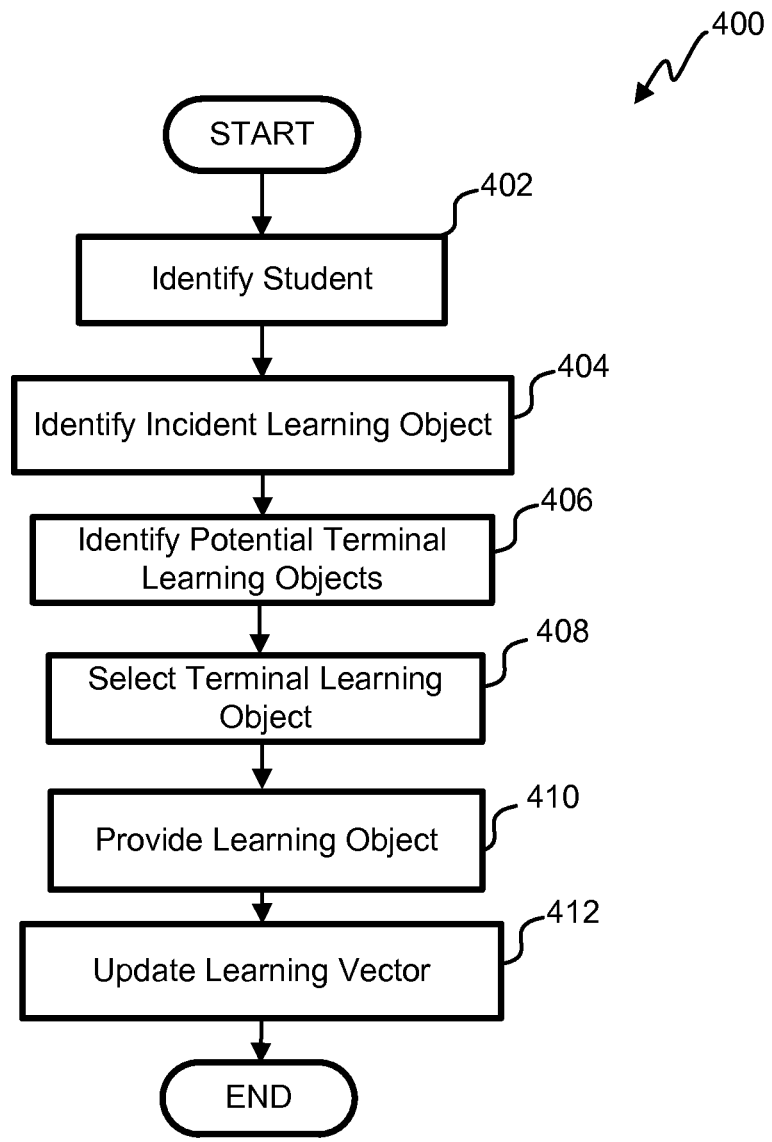
FIG. 4 is a flowchart illustrating one embodiment of a process for selecting a terminal learning object and updating a learning vector.

With reference now to FIG. 4, a flowchart illustrating one embodiment of a process 400 for selecting a terminal learning object and updating a learning vector is shown. The process 400 begins at block 402 wherein a student is identified. In some embodiments, the student is identified based on inputs received from the user device 106 and/or based on information stored within the student database 104-E. After the student has been identified, the process 400 proceeds to block 404 wherein the incident learning object is identified. In some embodiments, after the student has been identified, information relating to the student's progress in the learning object network 300 can be retrieved from the student database 104-E. This information can include, for example, the student context. This information can identify learning objects that the student has completed and can be used to thereby identify the incident learning object. In some embodiments, for example, the student context can include one or several values associated with one or several of the learning objects, which values can indicate whether the student has completed the one or several of the learning objects. In one embodiment, for example, these values can be extracted from the student context and the processor 102 can identify the incident learning object as the learning object from which no learning vector has been traversed.

After the learning object has been identified, the process 400 proceeds block 406 wherein potential terminal learning objects are identified. In some embodiments, for example, the potential terminal learning objects are learning objects connected to the incident learning object via a single learning vector. In one embodiment, for example, after the processor 102 has identified the incident learning object, the processor 102 can retrieve information relating to learning vectors from the incident learning object. The processor 102 can then identify the learning objects at which the identified learning vectors terminate. These identified learning objects are the potential terminal learning objects. In some embodiments, a value can be associated with the potential terminal learning objects, which value can identify the potential terminal learning objects.

After the potential terminal learning objects has been identified, the process 400 proceeds to block 408 wherein a terminal learning object is selected, for example, from one of the identified potential terminal learning objects. In some embodiments, for example, the selection can be made by the processor 102 based on information relating to the terminal learning objects and/or the learning vector leading to the terminal learning object. In some embodiments, for example, the combination of the student context as well as the learning vector context can be used by the processor 102 in selecting the terminal learning object.

After the terminal learning object has been selected, the process 400 proceeds to block 410 wherein the learning object is provided. In some embodiments, for example, the learning object can be provided to the user including, for example, the student, via the user device 106, and specifically via the network interface 200, the content engine 202, and/or the user interface 208. In some embodiments, providing learning object to the user can further include receiving answers which can be, for example, the inputs provided by the user in response to the assessment and/or answer data which answer data can be, for example, data generated based on the answers such as an indication of correct or incorrect answers, a score, an evaluation, or the like.

After the learning object has been provided, the process 400 proceeds to block 412 wherein the learning vector is updated. In some embodiments, for example, the learning vector can be updated, by the processor 102 and/or the user device 106, according to the received answers and/or answer data. In some embodiments, the learning vector can be updated to reflect an aspect the student performance in traversing the learning vector and/or in completing the terminal learning object of the learning vector.

The following flowcharts illustrate embodiments of processes for updating a learning vector and/or for generating data used in updating the learning vector. These processes can be performed as part of process 400 depicted in FIG. 4, or separate from the process 400 depicted in FIG. 4.

Figure 5:
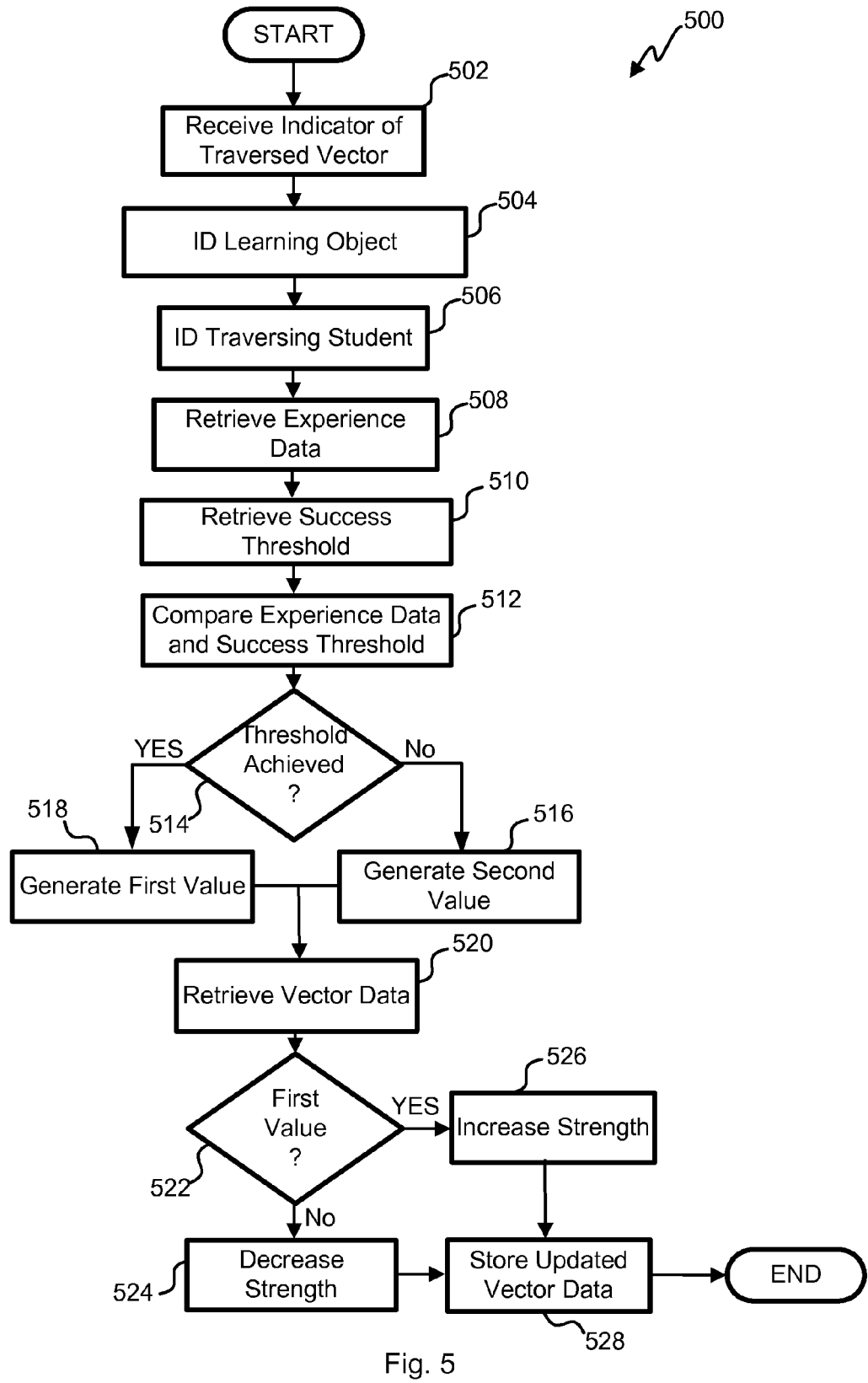
FIG. 5 is a flowchart illustrating one embodiment of a process for updating a learning vector based on a student outcome.

With reference now to FIG. 5, a flowchart illustrating one embodiment of a process 500 for updating a learning vector based on a student outcome is shown. In some embodiments, the process 500 can be performed by the learning system 100 and/or by a component thereof. The process 500 begins at block 502 wherein an indicator of the traversed vector is received. In some embodiments, the indicator of the traversed vector can indicate the incident learning object to the traversed learning vector, the terminal learning object to the learning vector, and information relating to the traversal of the learning vector. In some embodiments, this information can be received from, for example, the user device 106, the data source 108, and/or one of the databases 104.

After the indicator of the traversed vector has been received, the process 500 proceeds to block 504 wherein the terminal learning object of the learning vector is identified. In some embodiments, this step can include evaluation of the indicator of the traversed vector for information identifying the terminal learning object of the learning vector. This can be performed by, for example, the processor 102, the user device 106, and/or a component of either of these.

After the terminal learning object of the learning vector has been identified, the process 500 proceeds to block 506 wherein the student that traversed the learning vector is identified. Similar to block 504, in some embodiments, this step can include evaluation of the indicator of the traversed learning vector for information identifying the traversing student. In some embodiments, this information can be a username, student identification number, an encrypted identifier, or any other data or information that identifies the student. The identification of the student can be, for example, performed by the processor 102, the user device 106, or any component of either of the processor 102 and the user device 106.

After the traversing student has been identified, the process 500 proceeds to block 508 wherein experience data is retrieved. In some embodiments, the experience data can identify the student experience with the learning vector and the terminal learning object associated with the learning vector. Specifically, the experience data can identify the success and/or degree of success of the student in traversing the learning vector, the speed with which the student traversed the learning vector, or the like. In some embodiments, this data can be extracted from the indicator of the traversed vector received in block 502, and in some embodiments, this information can be received from one of the databases 104, the user device 106, and/or the data source 108.

After the experience data has been retrieved, the process 500 proceeds to block 510 wherein a success threshold is retrieved. In some embodiments, the success threshold can be a threshold that identifies the boundary between student performance corresponding to the successful completion of a learning object and/or traversal of a learning vector. The success threshold can be retrieved from one of the databases 104 such as for example, the evaluation database 104-D.

After the success threshold has been retrieved, the process 500 proceeds to block 512 wherein the experience data is compared with the success threshold. In some embodiments, this comparison can include determining if the experience data exceeds the success threshold such as if the value representing the experience data is larger than the value representing the success threshold. In some embodiments, this comparison can be performed by the processor 100 and/or by any other component of the learning system 100.

After the experience data has been compared with the success threshold, then the process 500 proceeds to decision state 514 wherein it is determined if the success threshold has been achieved. In some embodiments, for example, this can include receiving results of the comparison performed in block 512 determining, based on the results of the comparison performed in block 512, if the success threshold has been achieved. This determination can be performed by the processor 102 and/or by one of the user devices 106. If the success threshold has been achieved, then the process 500 proceeds to block 518 wherein a first value is generated and/or associated with the indicator of the traversed vector, the identification of the traversing student, the identification of the learning object, the experience data, and/or the like. In some embodiments, the first value can be generated according to a Boolean function by, for example, the processor 102 and/or the user device 106. Returning again to decision state 514 if it is determined that the threshold value has not been achieved, then the process 500 proceeds to block 516 wherein a second value is generated and/or associated with the indicator of the traversed vector, the identification of the traversing student, the identification of the learning object, the experience data, and/or the like. In some embodiments, for example, the second value can be generated according to a Boolean function by, for example, the processor 102 and/or the user device 106.

After the first or second value has been generated, the process 500 proceeds to block 520 wherein the vector data is retrieved. In some embodiments, vector data can include information identifying the vector strength and/or the magnitude of the vector. In some embodiments, for example, the vector data can be retrieved from the vector database 104-B. In such an embodiment, for example, the first value, which can be, for example, the first value after the vector data has been retrieved, the process 500 proceeds to decision state 522 wherein it is determined if the first value is generated. In some embodiments, this can include determining if the first value was associated with the indicator of the traversed vector, with the identification of the traversing student, with the identification of the learning object, with the experience data, and/or the like.

If it is determined that the first value was generated, then the process proceeds to block 526 wherein the strength of the vector is increased. In some embodiments, for example, the strength of the vector can be increased by positively incrementing a value associated with the vector strength. Returning again to decision state 522, if it is determined that the first value was not generated, then the process proceeds to block 524 wherein the strength of the vector is decreased. In some embodiments, for example, the strength of the vector can be decreased by decrementing a value associated with the vector strength. After the strength of the vector has been updated according to one of blocks 524, 526, the process 500 proceeds to block 528 wherein the updated vector data is stored. In some embodiments, the updated vector data can be within one of the databases 104 such as, for example, the vector database 104-B.

Figure 6:
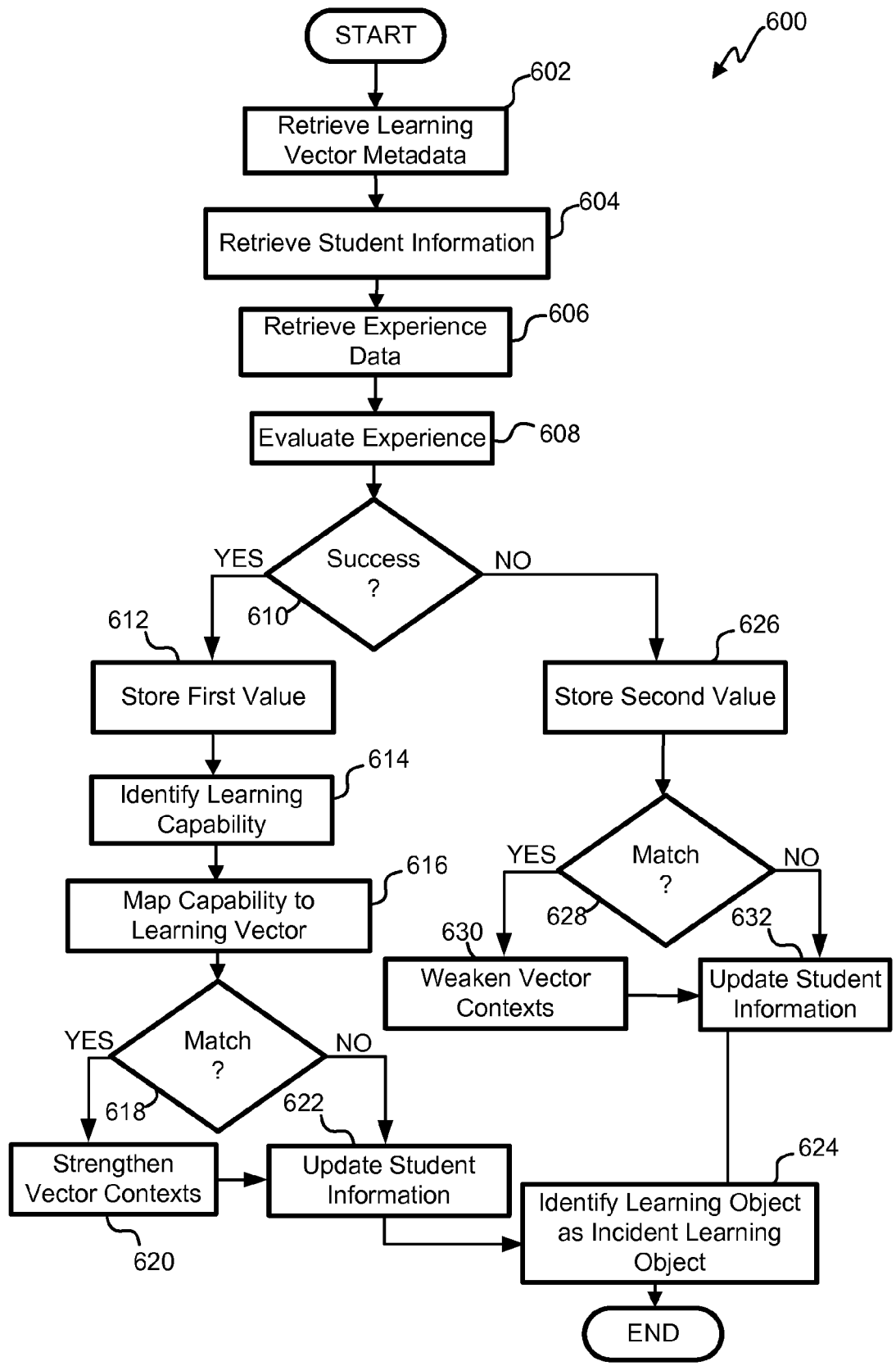
FIG. 6 is a flowchart illustrating one embodiment of a process for updating a learning vector based on the student outcome and the learning vector context.

With reference now to FIG. 6, a flowchart illustrating one embodiment of a process 600 for updating a learning vector based on the student outcome in the learning vector context is shown. The process 600 can be performed by the learning system 100, by a component of the learning system 100, by the user device 106, and/or by a component thereof. The process 600 begins at block 602 wherein learning vector metadata is received. In some embodiments, the learning vector metadata can be received from the vector database 104-B, and can include information identifying the strength, magnitude, direction, or other aspects of the vector. In some embodiments, the vector metadata can include information identifying a learning vector context. The learning vector context can comprise aggregated data relating to students who have traversed the learning vector. In some embodiments, this information can include correlations between all or portions of the student context and outcomes of traversing the learning vector. In some embodiments this information can include correlations between the learning style of the student and the expected level of success in traversing the learning vector.

After the learning vector metadata has been received, the process 600 proceeds to block 604 wherein student information is retrieved. In some embodiments, the student information can comprise student context information, which student context can identify a student's learning style, the student's current learning objectives, and/or the student's learning performance history which can be, for example, biased for temporal significance. In some embodiments, the student context can be received from the student database 104-E.

After the student information has been retrieved, the process 600 proceeds to block 606 wherein experience data is retrieved. In some embodiments, the experience data can identify the student experience in traversing the learning vector. Specifically, the experience data can identify the success and/or degree of success of the student in traversing the learning vector, the speed with which the student traversed the learning vector, or the like. In some embodiments, the experience data can be retrieved from the user device 106 and/or the data source 108.

After the experience data has been retrieved, the process 600 proceeds block 608 wherein the student experience is evaluated. In some embodiments, the evaluation of the student experience can be performed by the processor 102 and/or by the user device 106. In some embodiments, this evaluation can include determining whether the student successfully traversed the learning vector and successfully completed material associated with the learning object. After the student's experience with the learning vector has been evaluated, the process 600 proceeds to decision state 610 wherein it is determined if the student successfully traversed the learning vector. In some embodiments, this determination can be made by the processor 102 or the user device 106. In some embodiments, the determination of the student success can include associating a value, according to a Boolean function, with the student. In such an embodiment, a first value can be associated with the student if the student successfully traversed the learning vector, and a second value can be associated with the student if the student did not successfully traverse the learning vector.

If it is determined that the student successfully traversed the learning vector, then the process 600 proceeds to block 612 wherein the first value is stored. In some embodiments, the first value can be stored in one of the databases 104 including, for example, the student database 104-D. After the first value has been stored, the process 600 proceeds to block 614 wherein the learning capability of the student is identified. In some embodiments, the identification of the learning capability the student can include retrieving information from the student context identifying the student's learning style and/or the student's historic learning experiences. In some embodiments, this information can identify how a student learns, best modes for the student to learn, subject matter abilities or difficulties, or the like. In some embodiments, this identification can be performed by the processor 102, by the user device 106, or by a component of either of these.

After the learning capability of the student is identified, the process 600 proceeds to block 616 wherein the learning capability of the student is mapped to the learning vector, and specifically to the learning vector metadata including the learning vector context. In some embodiments, this step can include determining whether aspects of the student context, and specifically the student learning style correspond with information generated by students that have previously traversed the learning vector. In one embodiment, for example, this can include determining whether previously traversing students had the same learning style and/or same or similar learning context as the current traversing student. In some embodiments, this mapping can be performed by the processor 102 and/or by the user device 106.

After the capability of the student has been mapped to the learning vector, the process 600 proceeds to decision state 618 wherein it is determined if the student learning capability, and particularly, if the student learning style corresponds to the learning styles of students who successfully traversed the learning vector. This determination can be made, in some embodiments, by the processor 102 and/or by the user device 106. If it is determined that there is a match, then the process 600 proceeds to block 620 wherein the vector contexts are strengthened. In some embodiments, this can include strengthening the learning vector as discussed to block 426 above, or strengthening the vector with respect to the specific and/or matching learning context between the student learning capability and the learning vector. In some embodiments, for example, the strength of the vector context can be increased by positively incrementing a value associated with the vector strength.

After the vector contexts have been strengthened, or, returning again to decision state 618, if it is determined that there is not a match, then the process 600 proceeds to block 622 wherein student information is updated. In some embodiments, for example, this can include updating the student context to reflect the success of the student in traversing the learning vector. In some embodiments, for example, this can further include updating the student context to either strengthen the identification of the student learning style identified within the student context, or to weaken the identification of the student learning style identified with the student context. In some embodiments, for example, in which the student learning capability matches learning capabilities of students who successfully traversed the learning vector, the identification of the student learning style within the student context can be strengthened by, for example, positively incrementing a value associated with the learning style. In some embodiments, for example, in which the student learning capability does not match the learning capabilities of students who successfully traverse the learning vector, the student context can be updated to reflect potentially student learning style were composite learning style. In one embodiment, for example, a new learning style can be identified, which learning style can be the learning style shared by students who successfully traversed the learning vector.

After the student information has been updated, the process 600 proceeds to block 624 wherein the completed learning objective is identified as an incident learning objective and the new terminal learning objective and the associated learning vector is identified. In some embodiments, this identification can be performed by the processor 102 or the user device 106 and can be based on information contained within one or more of the databases 104.

Returning again to decision state 610, if it is determined that the student did not successfully traverse the learning vector, then the process 600 proceeds to block 626 wherein the second value is stored. In some embodiments, the second value can be stored in one of the databases 104 including, for example, the student database 104-D.

After the second value has been stored, the process 600 proceeds to decision state 628 wherein it is determined if the learning capability of the student that currently traversed the learning vector, and particularly, if that student's learning style corresponds to the learning styles of students who previously did not successfully traverse the learning vector. In some embodiments, this can include identifying the learning capability of the student as discussed in block 614 and/or mapping the learning capability of the student to the learning vector, and particularly to the context of the learning vector as discussed in block 616. This determination can be made, in some embodiments, by the processor 102 and/or by the user device 106. If it is determined that there is a match, then the process 600 proceeds to block 630 wherein the vector context are weakened. In some embodiments, this can include weakening the learning vector as discussed to block 424 above, or weakening the vector with respect to the specific and matching learning contexts between the student learning capability and the learning vector. In some embodiments, for example, the strength of the vector context can be decreased by decrementing a value associated with the vector strength.

After the vector contexts have been weakened, or, returning again to decision state 628, if it is determined that there is not a match, then the process 600 proceeds to block 632 wherein student information is updated. In some embodiments, for example, this can include updating the student context to reflect the failure of the student in traversing the learning vector. In some embodiments, for example, this can further include updating the student context to either strengthen the identification of the student learning style identified within the student context, or to weaken the identification of the student learning style identified with the student context. In some embodiments, for example, in which the student learning capability matches learning capabilities of students who did not successfully traverse the learning vector, the identification of the student learning style within the student context can be strengthened by, for example, positively incrementing a value associated with the learning style. In some embodiments, for example, in which the student learning capability does not match the learning capabilities of students who did not successfully traverse the learning vector, the student context can be updated to reflect potentially student learning style were composite learning style. In one embodiment, for example, a new learning style can be identified, which learning style can be the learning style shared by students who did not successfully traverse the learning vector.

After the student information has been updated, the process 600 proceeds to block 624 wherein the completed learning objective is identified as an incident learning objective and the new terminal learning objective and the associated learning vector is identified. In some embodiments, this identification can be performed by the processor 102 or the user device 106 and can be based on information contained within one or more of the databases 104.

Figure 7:
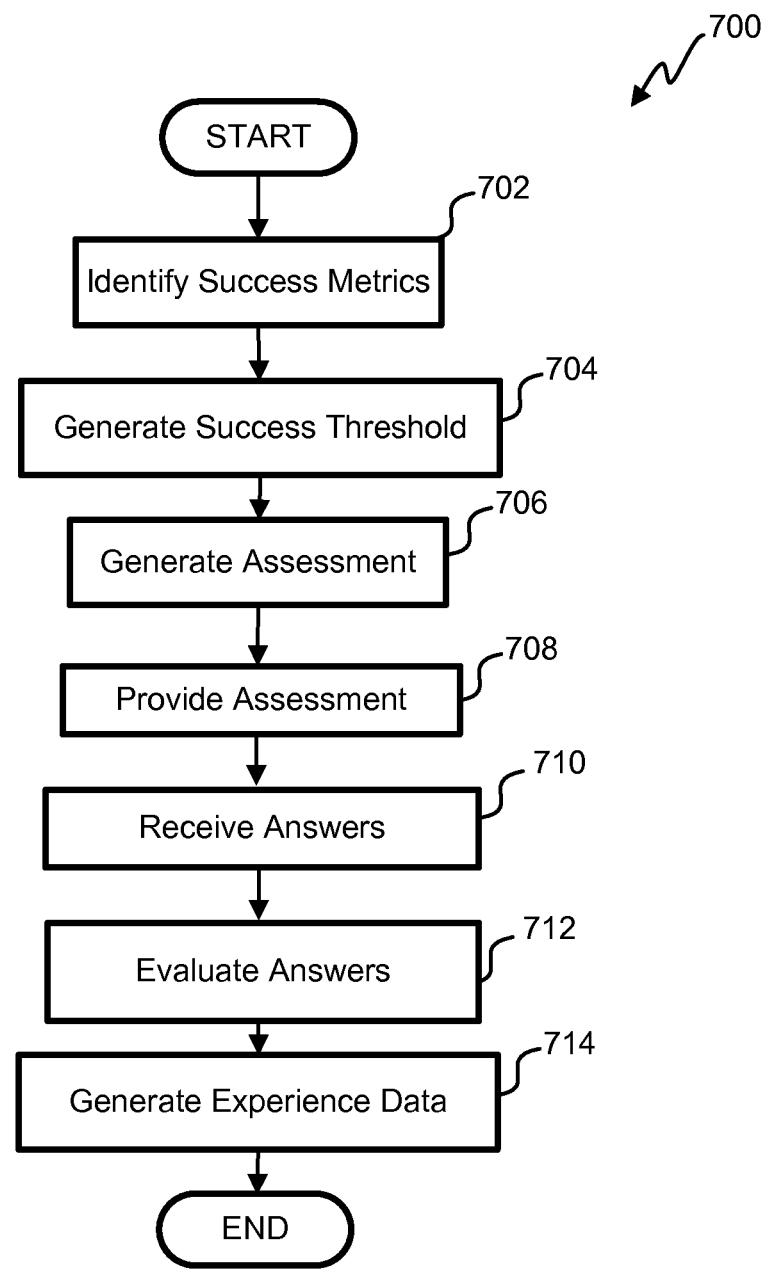
FIG. 7 is a flowchart illustrating one embodiment of a process for generating experience data.

With reference now to FIG. 7, a flowchart illustrating one embodiment of a process 700 for generating experience data is shown. In some embodiments, the experience data characterizes student activity in traversing the learning vector. In some embodiments, the experience data characterizes the degree of student success in traversing the learning vector and in some embodiments, for example, the experience data can be a binary indicator of the success or failure of the student in traversing the learning vector. The process 700 can be performed by the learning system 100 and/or a component thereof including, for example, the processor 102 and/or the user device 106.

The process 700 begins at block 702 wherein a success metric is identified. The success metric can identify a desired outcome resulting from the completion of the learning object and can relate to any aspect of the learning object. In some embodiments, the success metric can identify parameters of the comprehensive successful traversal of the learning vector and/or the comprehensive successful completion of the learning object. In some embodiments, the comprehensive successful traversal of the learning vector and/or the comprehensive successful completion of the learning object can be based on the student mastery of all of the content of the learning object.

In some embodiments, the success metric can comprise a plurality of parameters that each identify the successful traversal of the learning vector and/or the successful completion of the learning object with respect to a subset of the content of the learning object. In some embodiments, this subset of the content of the learning object can include, for example, quantile content of the terminal learning object, lexile content of the terminal learning object, the topic of the terminal learning object, the quantile, lexile, or topic of any or all of the content objects of the learning object, or the like. In some embodiments, the success metric can be retrieved from one of the databases 104 and/or can be in good into the learning system 100 via one of the user devices 106 and/or one of the other data sources 108.

After the success metric has been identified, the process 700 proceeds to block 704 wherein the success threshold is generated. In some embodiments, the success threshold can be a value defining a successful traversal of the learning vector and defining an unsuccessful traversal of the learning vector. The success threshold can be generated based on the success metric, and in some embodiments in which a plurality of success metrics have been identified, the success threshold can comprise a plurality of thresholds associated with the learning vector. In one such embodiment, each of the thresholds of the success threshold can be associated with one or several of the success metrics and thus, in one embodiment, for example, one of the thresholds of the success threshold can be associated with the quantile performance of the student in traversing the learning vector, one of the thresholds of the success threshold can be associated with the lexile performance of the student in traversing the learning vector, one of the thresholds of the success threshold can be associated with the student level of mastery of the subject matter of the learning object, one of the thresholds of the success threshold can be associated with student mastery of subject matter associated with one or several of the content objects of the learning object, one of the thresholds of the success threshold can be associated with a student attribute such as, for example, student education history, student learning style and/or learning tendency, or the like. In some embodiments, each of the thresholds of the success threshold can be used to identify the successful traversal of the learning vector with respect to one or more of the success metrics. Thus, in one embodiment, for example, a student may successfully traverse the learning vector with respect to the quantile performance of the student and a student may simultaneously fail to successfully traverse the learning vector with respect to the lexile performance of the student. In one such embodiment, the threshold associated with quantile performance may indicate the student's successful traversal of the learning vector and the threshold associated with lexile performance may indicate the student's failure to successfully traverse the learning vector. In some embodiments, the success threshold can be stored in one of the databases 104 such as, for example, the evaluation database 104-D.

After the success threshold has been generated, the process 700 proceeds to block 706 wherein an assessment is generated. In some embodiments, for example, the assessment can be generated based on the content objects of the learning object and can be configured to provide data corresponding to the success metrics and/or the generated success threshold to allow the determination of whether the student successfully traversed the learning vector and successfully completed the terminal learning object of the learning vector. In some embodiments, the assessment can be generated based on the quantile level, the lexile level, the quantile content, the lexile content, or the subject matter of the learning object and/or of the content objects of the learning object. The assessment can be generated by the processor 102, the user device 106 and/or one of the data sources 108.

After the assessment has been generated, the process 700 proceeds to block 708 wherein the assessment is provided. In some embodiments, the assessment can be provided to the student via, for example, the user device 106 and specifically via the user interface 208. After the assessment has been provided, the process 700 proceeds to block 710 wherein answers and/or answer data is received. In some embodiments, the answers and/or the answer data can be received from the student via, for example, the user device 106 and/or the user interface 208 of the user device. After the answers and/or answer data has been received, the process 700 proceeds to block 712 wherein the answers are evaluated. In some embodiments, the answers and/or the answer data can be evaluated by comparing the answers and/or the answer data to a correction key and/or an evaluation metric. This comparison can be performed by the processor 102, the user device 106, or a component of either of these.

After the answers of been evaluated, the process 700 proceeds to block 714 wherein experience data is generated. In some embodiments, the experience data can be generated based on the results of the evaluation of the answers, and the experience data can reflect the degree to which the student demonstrated mastery of the subject matter of the learning object and/or the one or several content objects of the learning object. In some embodiments, the experience data can include information corresponding to some or all of the plurality of success metrics and/or some or all of the plurality of thresholds in the success threshold. The experience data can be generated by the processor 102, the user device 106, or a component of either of these.

Figure 8:
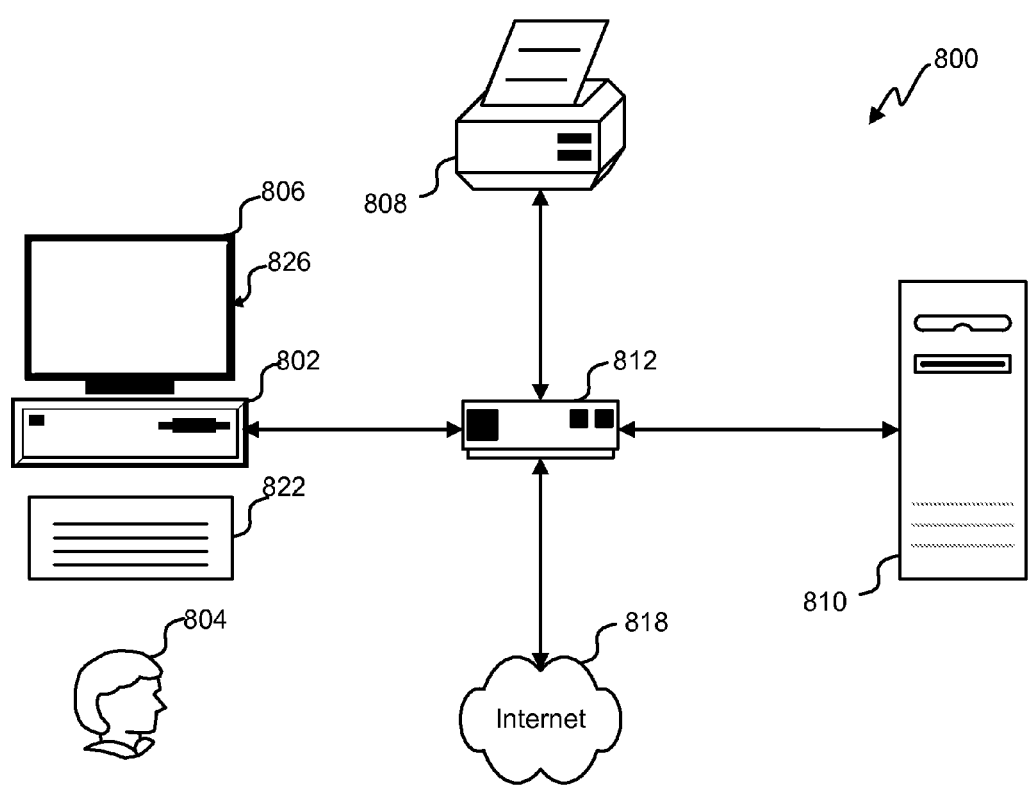
FIG. 8 is a schematic illustration of one embodiment of the computer system.

With reference now to FIG. 8, an exemplary environment with which embodiments may be implemented is shown with a computer system 800 that can be used by a user 804 as all or a component of the learning system 100. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A user 804 can input commands into the computer 802 using various input devices, such as a mouse, keyboard 822, track ball, touch screen, etc. If the computer system 800 comprises a mainframe, a designer 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

Figure 9:
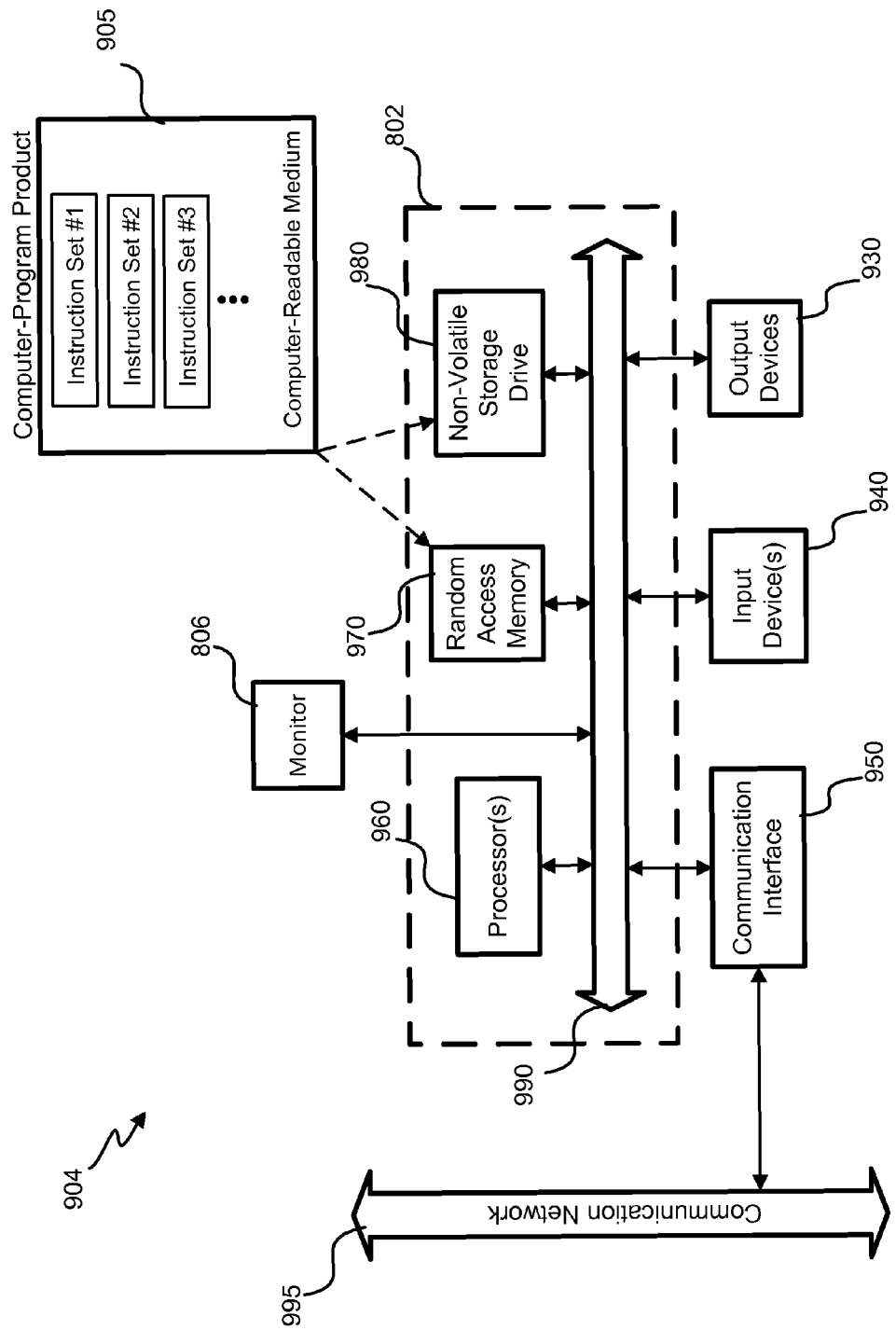
FIG. 9 is a schematic illustration of one embodiment of a special-purpose computer system.

With reference to FIG. 9, an embodiment of a special-purpose computer system 904 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 826, it is transformed into the special-purpose computer system 904.

Special-purpose computer system 904 comprises a computer 802, a monitor 806 coupled to computer 802, one or more additional user output devices 930 (optional) coupled to computer 802, one or more user input devices 940 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 904 to perform the above-described methods. Computer 802 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 802 and loaded into memory 970. Each processor 960 may comprise a microprocessor, such as a microprocessor from Intel® or Advanced Micro Devices, Inc.®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft® Corporation, Solaris® from Oracle®, LINUX, UNIX, and the like.

User input devices 940 include all possible types of devices and mechanisms to input information to computer system 802. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 806 via a command such as a click of a button or the like. User output devices 930 include all possible types of devices and mechanisms to output information from computer 802. These may include a display (e.g., monitor 806), printers, non-visual displays such as audio output devices, etc.

Communications interface 950 provides an interface to other communication networks 995 and devices and may serve as an interface to receive data from and transmit data to other systems, WANs and/or the Internet 818. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 802, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem may utilize multiple busses or communication paths within the computer 802.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of maintaining a learning vector comprising:
   automatically generating a learning object network, wherein generating the learning object network comprises:
      receiving a plurality of content objects from a plurality of data sources via a network at a processor, wherein each of the learning objects comprises an aggregation of learning content that is associated with an assessment;
      automatically identifying on the processor a first learning object, wherein the first learning object comprises a first aggregation of learning content, wherein the aggregation of learning content is associated with an assessment;
      automatically identifying on the processor a second learning object, wherein the second learning object comprises a second aggregation of learning content, wherein the aggregation of learning content is associated with an assessment;
      automatically identifying on the processor a prerequisite relationship between the first learning object and the second learning object, wherein the first learning object is a prerequisite to the second learning object;
      automatically generating on the processor a learning vector connecting the first learning object and the second learning object, the learning vector comprising a direction and a strength, wherein the direction of the learning vector indicates that the first learning object is a prerequisite of the second learning object, and the strength of the learning vector indicates a likelihood of a student successfully traversing the learning vector, wherein the strength of the learning vector varies with respect to a student context, wherein the student context describes an attribute of the student; and
      repeating the generating of learning vectors until the plurality of content objects are connected;
   receiving an input from a first student device via the network;
   automatically identifying a student user of the first student device based on the received input and information retrieved from a student database;
   automatically retrieving information relating to a plurality of learning object networks;
   automatically identifying with the processor one of the plurality of learning object networks relevant to the student user of the first student device;
   automatically receiving at the processor an input indicative of the traversal of the learning vector, wherein the input is received from the first student device via a network, wherein the input identifies a student property and the effectiveness of the learning vector;
   automatically determining on the processor a value according to a Boolean function, wherein the value comprises a first value when the input indicative of the traversal of the learning vector indicates a desired outcome and wherein the value comprises a second value when the input indicative of the traversal of the learning vector indicates an undesired outcome, and
   automatically determining that the student context of the student corresponds to a context of a first at least one student that previously traversed the learning vector when the first value is determined;
   automatically strengthening the learning vector when the first value is determined and when the student context of the student corresponds to the context of the first at least one student that previously traversed the learning vector;
   receiving an identifier from a second student device via a network;
   automatically identifying a second student context associated with the user of the second student device;
   automatically varying the magnitudes of the learning vectors connecting the plurality of content objects based on the second student context;
   automatically providing the first learning object to the second student device via a network, wherein the second student device is selected for receipt of the first learning object based on the learning vector and student information retrieved by the processor from the student database when the learning vector is strengthened;
   receiving an indicator of completion of the provided first learning object; and
   automatically generating and sending a communication to the second student device, wherein the communication comprises an enhancement object automatically triggered for providing to the student via a threshold, wherein the enhancement object is outside of the learning path of the provided first learning object, and wherein the communication activates a user interface of the second student device to provide the enhancement object to the user via a screen of the second student device.

2. The method of claim 1, further comprising retrieving a success threshold, wherein the success threshold is a value, the attainment of which indicates success or failure in the traversal of the learning vector.

3. The method of claim 2, wherein the success threshold comprises a plurality of thresholds.

4. The method of claim 3, wherein some of the thresholds delineate between successful traversal of the learning vector and unsuccessful traversal of the learning vector with respect to different success metrics.

5. The method of claim 3, wherein the learning object comprises a plurality of content objects, each content object containing a portion of the learning content of the learning object.

6. The method of claim 5, wherein each of the content objects of the learning object is associated with at least one of the some of the plurality of success metrics.

7. The method of claim 4, wherein at least one of the some of the plurality of success metrics is indicative of mastery of the lexile content of the learning object.

8. The method of claim 4, wherein at least one of the some of the plurality of success metrics is an indicator of mastery of the quantile content of the learning object.

9. The method of claim 4, further comprising generating the assessment associated with the second learning object, wherein the assessment comprises a plurality of questions directed to the success metrics.

10. The method of claim 2, wherein determining a value according to a Boolean function further comprises comparing the input indicative of the traversal of the learning vector to the success threshold; and
   wherein the value is assigned when the comparison of the input indicative of the traversal of the learning vector to the success threshold indicates a successful traversal of the learning vector.

11. The method of claim 1, wherein the first at least one student that previously traversed the learning vector successfully traversed the learning vector.

12. The method of claim 1, further comprising:
   determining if the student context corresponds to the student context of a second at least one student that previously traversed the learning vector if the second value is determined; and
   weakening the learning vector if the second value is determined and if the student context of the student corresponds to the context of the second at least one student that previously traversed the learning vector.

13. The method of claim 12, wherein the second at least one student that previously traversed the learning vector unsuccessfully traversed the learning vector.

14. The method of claim 1, further comprising updating the student context to strengthen the identification of a student learning style indicated in the student context; and matching the learning style indicated in the context of the first at least one student that previously traversed the learning vector if the first value is determined and if the student context of the student corresponds to the context of the first at least one student that previously traversed the learning vector.

15. A method of optimizing a learning vector within a learning object network, the method comprising:
   automatically generating a learning object network, wherein generating the learning object network comprises:
      receiving a plurality of content objects from a plurality of data sources via a network at a processor, wherein each of the learning objects comprises an aggregation of learning content that is associated with an assessment; and
      automatically generating a plurality of learning vectors connecting the plurality of content objects with the processor based on information received from a plurality of user devices, wherein each of the plurality of learning vectors connects two of the plurality of learning objects and identifies a prerequisite relationship between the connected two of the plurality of learning objects, wherein each of the plurality of learning vectors comprises a direction identifying the prerequisite relationship and a magnitude;
   receiving an input from a first student device via the network;
   automatically identifying a student user of the first student device based on the received input and information retrieved from a student database;
   automatically retrieving information relating to a plurality of learning object networks;
   automatically identifying with the processor one of the plurality of learning object networks relevant to the student user of the first student device;
   automatically identifying on the processor an incident learning object, wherein the incident learning object comprises an initial position of the student user within the learning object network;
   automatically identifying on the processor a plurality of potential terminal learning objects, wherein the potential terminal learning objects each comprise an aggregation of learning content associated with an assessment, and wherein the incident learning object is a prerequisite to each of the potential terminal learning objects;
   automatically identifying on the processor a plurality of learning vectors, each of the plurality of learning vectors extending from the incident learning object to one of the potential terminal learning objects, wherein each of the plurality of learning vectors indicates the prerequisite relationship with the incident learning object and identifies the strength of the learning vector, wherein the strength of the learning vector varies with respect to a student context, wherein the student context describes an attribute of the student user;
   selecting with the processor one of the plurality of potential terminal learning objects as the terminal learning object;
   automatically providing the terminal learning object to the student user;
   automatically adding an identifier to memory associating the terminal learning object with the student user;
   receiving at the processor an indicator of the completion of the learning object, wherein the indicator identifies a student property and the effectiveness of the learning vector;
   automatically determining with the processor a value according to a Boolean function, wherein the value comprises a first value when the indicator of the completion of the learning object indicates a desired outcome and wherein the value comprises a second value when the indicator of the completion of the learning object indicates an undesired outcome,
   automatically determining that the student context of the student user corresponds to a context of at least one student that previously traversed the learning vector when the first value is determined;
   automatically adjusting the strength of the learning vector according to the value, wherein the learning vector is strengthened when the value comprises the first value and when the student context of the student user corresponds to the context of the at least one student that previously traversed the learning vector;
   receiving an identifier from a second student device via a network;
   automatically identifying a second student context associated with the user of the second student device;
   automatically varying the magnitudes of the plurality of learning vectors connecting the plurality of content objects based on the second student context; and
   automatically providing one of the plurality of content objects to the second student device, wherein the second student device is selected for receipt of the one of the plurality of learning vectors based on the learning vector and student information retrieved by the processor from the student database;
   receiving an indicator of completion of the provided learning object; and
   automatically generating and sending a communication to the second student device, wherein the communication comprises an enhancement object automatically triggered for providing to the student via a threshold, wherein the enhancement object is outside of the learning path of the provided learning object, and wherein the communication activates a user interface of the second student device to provide the enhancement object to the user via a screen of the second student device.

16. The method of claim 15, further comprising retrieving a success threshold, wherein the success threshold is a value, the attainment of which indicates success or failure in the traversal of the learning vector.

17. The method of claim 16, wherein the success threshold comprises a plurality of thresholds.

18. The method of claim 17, wherein some of the thresholds delineate between successful traversal of the learning vector and unsuccessful traversal of the learning vector with respect to different success metrics.

19. The method of claim 17, wherein the learning object comprises a plurality of content objects, each content object containing a portion of the learning content of the learning object.

20. The method of claim 19, wherein each of the content objects of the learning object is associated with at least one of the some of the plurality of success metrics.

21. The method of claim 18, wherein at least one of the some of the plurality of success outcomes is indicative of mastery of the lexile content of the learning object.

22. The method of claim 18, wherein at least one of the some of the plurality of success outcomes is an indicator of mastery of the quantile content of the learning object.

23. The method of claim 18, further comprising generating the assessment associated with the second learning object, wherein the assessment comprises a plurality of questions directed to the success metrics.

24. The method of claim 16, wherein determining a value according to a Boolean function further comprises comparing the input indicative of the traversal of the learning vector to the success threshold; and
    wherein the value is assigned when the comparison of the input indicative of the traversal of the learning vector to the success threshold indicates a successful traversal of the learning vector.

25. The method of claim 15, wherein the first at least one student that previously traversed the learning vector successfully traversed the learning vector.

26. The method of claim 15, further comprising:
    determining if the student context corresponds to the student context of a second at least one student that previously traversed the learning vector if the second value is determined; and
    weakening the learning vector if the second value is determined and if the student context of the student corresponds to the context of the second at least one student that previously traversed the learning vector.

27. The method of claim 26, wherein the second at least one student that previously traversed the learning vector unsuccessfully traversed the learning vector.

28. The method of claim 15, further comprising updating the student context to strengthen the identification of a student learning style indicated in the student context and matching the learning style indicated in the context of the first at least one student that previously traversed the learning vector if the first value is determined and if the student context of the student corresponds to the context of the first at least one student that previously traversed the learning vector.

29. A system for maintaining a learning vector based on inputs received from user devices, the system comprising:
    a server;
    a plurality of first user devices, wherein each of the plurality of first user devices comprises:
        a user interface configured to provide an assessment to a user and configured to receive user inputs in response to the provided assessment associated with a plurality of terminal learning objects; and
        a network interface configured to communicatingly connect to the server via a communication network to send data to the server and to receive data from the server;
    a second user device not included in the plurality of first user devices, wherein the second user device comprises:
        a user interface configured to receive inputs from a user; and
        a network interface configured to send and receive information via a communication network;
    a plurality of data sources communicatingly connected to the server via the communication network;
    wherein the server is configured to:
        receive a plurality of content objects from the plurality of data sources via the communication network, wherein each of the learning objects comprises an aggregation of learning content that is associated with an assessment;
        automatically identify a first learning object, wherein the first learning object comprises a first aggregation of learning content, wherein the aggregation of learning content is associated with an assessment;
        automatically identify a second learning object, wherein the second learning object comprises a second aggregation of learning content, wherein the aggregation of learning content is associated with an assessment;
        automatically identify a prerequisite relationship between the first learning object and the second learning object, wherein the first learning object is a prerequisite to the second learning object;
        automatically generate a learning vector connecting the first learning object and the second learning object, the learning vector comprising a direction and a strength, wherein the direction of the learning vector indicates that the first learning object is a prerequisite of the second learning object, and the strength of the learning vector indicates a likelihood of a student successfully traversing the learning vector, wherein the strength of the learning vector varies with respect to a student context, wherein the student context describes an attribute of the student user; and
        automatically repeat the generating of learning vectors until the plurality of content objects are connected into a learning network;
        receive inputs from the plurality of first user devices via the communication network, wherein inputs correspond to the traversal of one of the learning vectors in the learning network, wherein the inputs identify a student property and the effectiveness of the learning vector;
        automatically select one of the inputs and identify a student user associated with the selected one of the inputs based on the selected one of the inputs and information retrieved from the student database;
        automatically retrieve information relating to a plurality of learning object networks;
        automatically identify one of the plurality of learning object networks relevant to the student user;
        automatically determine a value according to a Boolean function, wherein the value comprises a first value when the selected input indicates a desired outcome and wherein the value comprises a second value when the selected input indicates an undesired outcome, and
        automatically determine that the student context of the student user corresponds to a context of at least one student that previously traversed the learning vector when the first value is determined;

automatically strengthen the learning vector when the first value is determined; and receive an identifier from a second student device via a network;

automatically identify second student context associated with the user of the second student device;

automatically vary the magnitudes of the plurality of learning vectors connecting the plurality of content objects based on the second student context; and automatically provide the first learning object to a second student device via the communication network when the first learning object is a potential terminal learning object to an incident learning object of the student user of the second student device, wherein the second student device is selected for receipt of the first learning object based on the learning vector and student information retrieved by the processor from the student database when the learning vector is strengthened;

receive an indicator of completion of the provided first learning object; and automatically generate and send a communication to the second student device, wherein the communication comprises an enhancement object automatically triggered for providing to the second student device via a threshold, wherein the enhancement object is outside of the learning path of the provided first learning object, and wherein the communication activates a user interface of the second student device to provide the enhancement object to the user via a screen of the second student device.

* * * * *